UNITED STATES PATENT OFFICE.

JOSEPH C. CLAMOND AND LADISLAS A. GAIFFE, OF PARIS, FRANCE.

IMPROVEMENT IN GALVANIC BATTERIES.

Specification forming part of Letters Patent No. 165,210, dated July 6, 1875; application filed November 6, 1874.

*To all whom it may concern:*

Be it known that we, JOSEPH CHARLES CLAMOND and LADISLAS ADOLPHE GAIFFE, both of Paris, France, have invented an Improved Composition for an Electric Battery, and method of preparing the same; and we do hereby declare that the following is a full, clear, and exact description of the same.

This invention relates to the employment of sesquioxide of iron, and more particularly of hydrated sesquioxide of iron, prepared as a depolarizing body—that is to say, capable of absorbing nascent hydrogen in liquid batteries—in combination with zinc and a solution of an ammoniacal salt. This constitutes a new kind of battery, which we term a sesquioxide-of-iron battery. The advantages of this improved battery are, that it may be simply and inexpensively made, the current produced is more constant, while the sesquioxide of iron is insoluble in ammoniacal salts.

The following are different modes of preparing this improved battery:

Take any kind of sesquioxide of iron—a substance which exists in nature under various forms—but preferably the sesquioxide of iron obtained by precipitating with the aid of ammonia the sesquioxide from perchloride of iron, or other solution of a salt of sesquioxide of iron. The precipitate, after being moistened and made into a paste, is to be well mixed with small coke, and then filled into a porous vessel around a carbon prism. This porous vessel is placed in another vessel, in which a zinc plate dips, and which contains a solution of ammoniacal salt, preferably hydrochlorate of ammonia, around the porous vessel. The battery is then complete.

Another preferable mode of preparing the battery, inasmuch as the porous vessel is dispensed with, consists in producing chemically the depolarizing agent in the pores of the carbon itself. This may be effected by either of the two following processes:

First, take gas-carbon or graphite, or carbon artificially prepared by calcining a mixture of powdered charcoal, sugar, tar, or equivalent substance, which carbon is first immersed in a solution of perchloride of iron, or of another salt of sesquioxide of iron, and then in ammonia, whereupon the sesquioxide of iron is precipitated, and remains incorporated in the pores of the carbon.

The second method consists in mixing finely-divided iron—for example, the mixture resulting from the calcination of an oxide of iron with charcoal, the whole being in fine powder—with the substances of which the artificial carbon is to be made, and then making the artificial carbon in the ordinary manner, whereupon it will be found to contain iron in a finely-divided state. The iron contained in the said carbon is then oxidized by exposing it to the air after moistening the same with a solution of ammoniacal salt, such as hydrochlorate of ammonia.

We claim as our invention—

1. The improved sesquioxide-of-iron battery, containing sesquioxide of iron, in combination with zinc and an ammoniacal salt, as specified.

2. The method herein described of preparing a sesquioxide-of-iron battery by mixing sesquioxide of iron with coke, or fixing it in the pores of carbon, substantially as specified.

JOSEPH CHARLES CLAMOND.
LADISLAS ADOLPHE GAIFFE.

Witnesses:
EMILE DUHAN,
ROBT. M. HOOPER.